United States Patent [19]
Alvis et al.

[11] Patent Number: 5,713,667
[45] Date of Patent: Feb. 3, 1998

[54] TEMPERATURE SENSING PROBE FOR MICROTHERMOMETRY

[75] Inventors: Roger Alvis, Cupertino; Andrew N. Erickson, Santa Clara; Ayesha R. Raheem Kizchery, Palo Alto; Jeremias D. Romero, San Jose; Bryan M. Tracy, Oakland, all of Calif.

[73] Assignee: Advanced Micro Devices, Inc., Sunnyvale, Calif.

[21] Appl. No.: 482,229

[22] Filed: Jun. 7, 1995

[51] Int. Cl.$^6$ .................................................. G01K 7/01
[52] U.S. Cl. .................... 374/178; 374/137; 374/142
[58] Field of Search ........................ 374/178, 137, 374/142, 124, 120, 57, 179

[56] References Cited

U.S. PATENT DOCUMENTS

| | | | |
|---|---|---|---|
| 3,719,979 | 3/1973 | Andrews, Jr. et al. | 374/178 |
| 4,747,698 | 5/1988 | Wickramasinghe et al. | 374/124 |
| 5,154,514 | 10/1992 | Gambino et al. | 374/178 |
| 5,195,827 | 3/1993 | Audy et al. | 374/178 |
| 5,302,024 | 4/1994 | Blum | 374/178 |
| 5,356,218 | 10/1994 | Hopson et al. | 374/124 |
| 5,388,323 | 2/1995 | Hopson et al. | 374/142 |
| 5,441,343 | 8/1995 | Pylkki et al. | 374/137 |

OTHER PUBLICATIONS

J. Carrejo et al., "multi–Purpose Metal antilever Tip For Simultaneous AFM and Thermal Imaging", Technical Developments, Motorola, Inc., vol. 18, pp. 12–13, Mar. 1993.

Application Newsletter, TopoMetrix, Summer 1994, No Month, vol. 94–2, pp. 1–8.

Application Notes, TopoMetrix, No. 1–0594–007, Aug. 1994.

Solid State Technology, Product News Mar. 1995, p. 119.

Masanori Sakimoto, et al., "Temperature Measurement of Al Metallization and the Study of Black's Model in High Current Density", International Reliability Physics Proceedings, 1995 IEEE, pp. 333–341 No Month.

*Primary Examiner*—Thomas B. Will
*Attorney, Agent, or Firm*—Skjerven,Morrill,MacPherson Franklin and Friel; T. Lester Wallace

[57] ABSTRACT

A diode is formed at the tip of a pointed portion of a probe of a scanning probe microscope. When the diode is forward biased, the current through the diode varies with the temperature of the diode. The magnitude of the current is an indication of the temperature of the tip of the probe. If the tip is scanned over a surface, a thermal map of the surface can be made and hot spots on the surface located. In some embodiments, the pointed portion of the probe is made of a semiconductor material (for example, silicon). A layer of a metal (for example, platinum) is made to contact the semiconductor material of the pointed portion only at the tip of the pointed portion, thereby forming a very small temperature sensing Schottky diode at the tip of the pointed portion.

12 Claims, 1 Drawing Sheet

TEMPERATURE SENSING PROBE FOR MICROTHERMOMETRY

FIELD OF THE INVENTION

This invention relates to scanning probe microscopy.

BACKGROUND INFORMATION

In determining why integrated circuits fail after they have operated correctly for long periods of time, it is often desirable to be able to locate an area of localized heating in an operating integrated circuit. Such an area of localized heating may, for example, be due to current crowding in a part of a metal trace the current carrying cross-sectional area of which is reduced. The current carrying cross-sectional area of a part of a metal trace may be reduced over time due to defects in the metal when the trace is formed, due to electromigration, due to diffusion along grain boundaries, and/or due to recrystallization.

A means is therefore sought whereby an area of localized heating on an integrated circuit can be located and/or thermally mapped for a protracted period of time while the integrated circuit is operating.

SUMMARY

A diode is formed at the tip of a pointed portion of a probe of a scanning probe microscope. When the diode is forward biased, the current through the diode varies with the temperature of the diode. The magnitude of the current is an indication of the temperature of the tip of the probe. If the tip is scanned over a surface, a thermal map of the surface can be made and hot spots on the surface located. In some embodiments, the pointed portion of the probe is made of a semiconductor material (for example, silicon). A layer of a metal (for example, platinum) is made to contact the semiconductor material of the pointed portion only at the tip of the pointed portion, thereby forming a very small temperature sensing Schottky diode at the tip of the pointed portion. The temperature sensing probe can operate in a system operating in any configuration of contact and non-contact modes of image acquisition.

Other structures and methods are also disclosed. This summary does not purport to define the invention. The invention is defined by the appended claims.

DETAILED DESCRIPTION OF THE PREFERRED EMBODIMENTS

In what is sometimes called "scanning probe microscopy", the tip of a very small probe is moved (i.e. "scanned") over the surface of a structure being studied. Physical contact is maintained between the tip of the probe and the surface, the deflection of the probe is detected as the scanning occurs, and a topographical map of the surface is obtained. A piezoelectric device is often used to scan the probe. In accordance with the present invention, a probe for use with such a scanning probe microscope has the ability to detect temperature and/or thermal gradients. Accordingly, the temperature of a small area of a surface of a structure under study can be detected by placing the temperature sensing probe on the small area. Moreover, a thermal map of the surface can be developed by scanning temperature sensitive probe over the surface.

Figure 1:
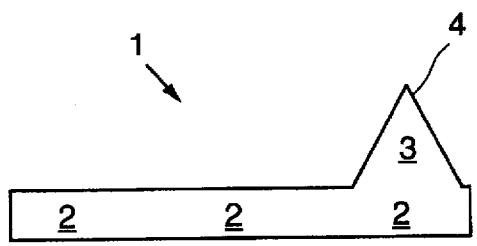
FIGS. 1–9 are cross-sectional and top-down diagrams illustrating a temperature sensing probe of a scanning probe microscope in accordance with the present invention.
Figure 2:
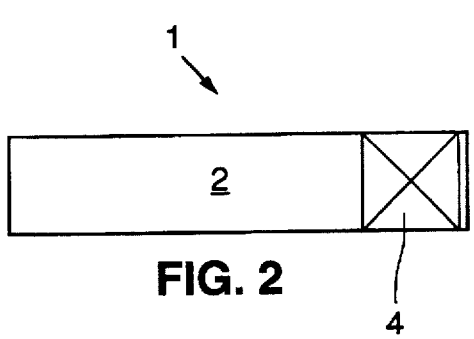

FIG. 1 is a cross-sectional side view showing an early step in the manufacture of a probe 1 in accordance with an embodiment of the present invention. Probe 1 includes a beam portion 2 and a pointed pyramidal portion 3. Probe 1 is made of P-type doped 100 orientation monocrystalline silicon oriented in the direction of point 4 (vertically oriented in the illustration) of pointed portion 3. Beam portion 2 is about 5 millimeters in length. FIG. 2 is a top-down view of probe 1.

Figure 3:
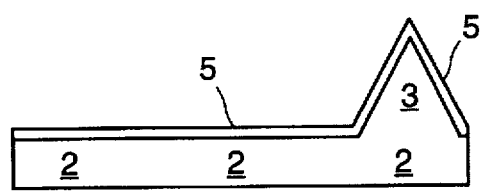
Figure 4:
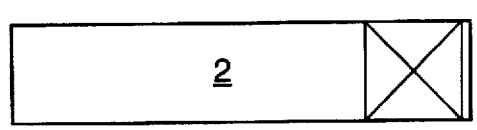

FIG. 3 is a cross-sectional side view showing the result of a subsequent step in the manufacture of probe 1 in which an insulator layer 5 is formed over the upper surface of probe 1. In some embodiments, this insulator layer is a layer of silicon oxide which is sputtered onto the upper surface so that the bottom surface of the beam portion 2 is not coated with insulator. Insulator layer may be approximately 0.1 microns thick. FIG. 4 is a top-down view of probe 1 after insulator layer 5 is formed on probe 1.

Figure 5:
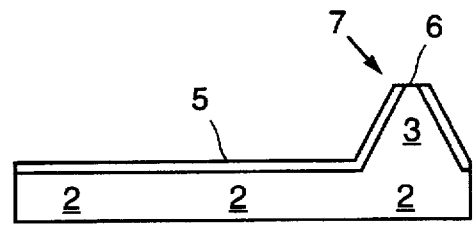
Figure 6:
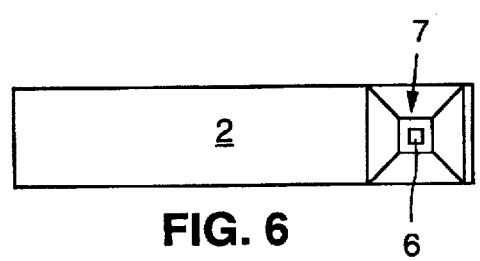

FIG. 5 is a cross-sectional side view showing the result of a subsequent step. The point 4 of the pointed portion 3 is removed thereby exposing a very small area 6 of silicon at the tip 7 of the pointed portion 3. The point can be removed by any suitable method including grinding the point away or removing the point using focussed ion beam milling techniques. Exposed area 6 generally is an area of less than approximately 1,000,000 square angstroms. The actual dimensions of the exposed area are dictated by spatial resolution requirements and the method of exposing silicon at the tip. FIG. 6 is a top-down view showing the exposed area 6 at the tip 7 of the pointed portion of the probe.

A thin native oxide may form in a very small amount of time on the exposed area of silicon. The probe may therefore be dipped in a 200 parts water to 1 part hydrofluoric acid bath for a short period (5–10 seconds) to remove the native oxide and to passivate the exposed area for a short period of time so that subsequent processing can take place before another native oxide layer forms.

Figure 7:
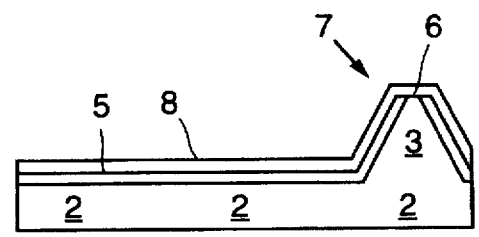
Figure 8:
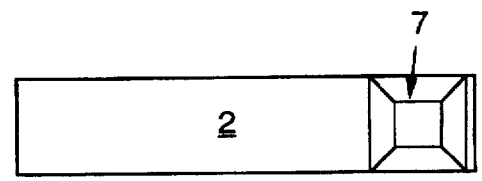

FIG. 7 is a cross-sectional side view showing the result of a subsequent step. A layer 8 of a metal is formed over the probe so that metal from layer 8 contacts silicon of the pointed portion 3 only at area 6. If the metal has a higher work function than does the material of which the pointed portion is made, a Schottky diode will be formed at area 6. If the pointed portion is silicon, such metals as gold, palladium and platinum can be used. Layer 8 can be formed by sputter deposition and the probe can be placed in a jig during the deposition so that metal is not deposited on the sidewalls of the beam portion 2. FIG. 8 is a top-down view of the probe after deposition of metal layer 8.

An optional protective layer (not shown) can then be formed over the metal layer to prevent corrosion and/or to increase the resistance of the tip of the probe to wear. The protective layer may be a layer of amorphous carbon.

Figure 9:
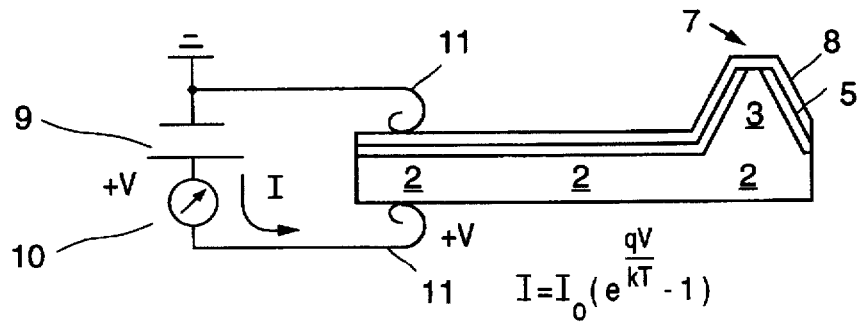

FIG. 9 is a cross-sectional side view showing the finished probe 1. The battery symbol 9, the current meter symbol 10, and the microscope clip symbols 11 are provided in the figure to illustrate use of the probe. Bias voltage +V is of sufficient magnitude to forward bias the Schottky diode in tip 7. Thermally generated carriers in the Schottky diode are swept through the depletion region of the diode and are measured as current I by current meter 10. The current I is given by the following equation:

$$I = I_0(e^{qV/kT} - 1) \qquad \text{(equ. 1)}$$

where T is in degrees kelvin. As temperature increases, the current I decreases. As temperature decreases, the current I increases. See "Solid State Electronic Devices", 2ed., page 152 by B. Streetman (1980). Note that the temperature-to-current relationship is exponential and not linear. The probe is therefore very sensitive to temperature. The tip can be made very small using semiconductor manufacturing techniques so that the diode can be heated and cooled quickly as the tip of the probe is moved over the surface under investigation. It is to be understood that the probe is used in a scanning probe microscope and that the illustrated clips, battery and current meter are only representative of microscope structures for monitoring the current I and for making mechanical and electrical connection to the probe.

Although the present invention is described in connection with certain specific embodiments for instructional purposes, the present invention is not limited thereto. Diodes other than metal-to-semiconductor diodes can be used. A semiconductor PN junction diode can be provided in the probe and the forward bias current of the semiconductor PN diode used to detect temperature. Multiple diodes and/or other circuit elements can be disposed on the tip of the probe. Other semiconductor temperature sensing circuits known in the art can be incorporated into the probe. The probe is not limited to use wherein the probe necessarily contacts the surface under analysis. The probe is not limited to use wherein it is scanned over a surface under analysis. The probe can have a temperature sensing strip at the tip of a wedge-like shaped pointed portion. Accordingly, various modifications, adaptations, and combinations of various features of the described embodiments are within the scope of the invention as set forth in the following claims.

What is claimed is:

1. A microthermometer probe, comprising:

a Schottky diode having a metal-to-semiconductor junction area of not more than 1,000,000 square angstroms;

a beam portion; and a substantially pointed portion, integral with said beam portion and extending from said beam portion, said Schottky diode being disposed in said substantially pointed portion.

2. The probe of claim 1, wherein a layer of an insulator material covers said substantially pointed portion except for a small surface area at a tip of said substantially pointed portion, a metal contacting said small surface area such that said diode is disposed at or near said tip.

3. The probe of claim 2, wherein said beam portion extends lengthwise in a first direction and wherein said substantially pointed portion extends from said beam portion in a second direction perpendicular to said first direction.

4. The probe of claim 3, wherein said substantially pointed portion has a pyramidal shape.

5. The probe of claim 3, wherein said substantially pointed portion has a wedge shape.

6. The probe of claim 4, wherein said tip is a planar surface oriented in a plane which lies normal to said second direction.

7. The probe of claim 1, wherein said beam portion and said substantially pointed portion comprise a semiconductor, a metal being in contact with said semiconductor of said substantially pointed portion to form said diode at a junction of said semiconductor of said substantially pointed portion and said metal.

8. The probe of claim 2, wherein said insulator material is semiconductor oxide and wherein said metal is platinum.

9. A microthermometer probe, comprising:

a Schottky diode having a metal-to-semiconductor junction area of not more than 1,000,000 square angstroms;

a beam portion; and a substantially pointed portion, integral with said beam portion and extending from said beam portion, said Schottky diode being disposed in said substantially pointed portion, a layer of an insulator material covering said substantially pointed portion except for a small surface area at a tip of said substantially pointed portion, a metal contacting said small surface area such that said Schottky diode is disposed at or near said tip, said beam portion extending lengthwise in a first direction and said substantially pointed portion extending from said beam portion in a second direction perpendicular to said first direction, wherein said tip is a planar surface oriented in a plane which lies normal to said second direction.

10. A method, comprising:

using a scanning microscope probe having a Schottky diode to generate a signal indicative of a temperature of said Schottky diode , said Schottky diode being disposed at a tip of a pointed portion of said probe, said tip being a planar surface, said Schottky diode having a metal-to-semiconductor junction area of not more than 1,000,000 square angstroms.

11. The method of claim 10, further comprising:

locating a hot spot on a surface of an integrated circuit by moving said scanning microscope probe with respect to said surface.

12. A method, comprising:

forward biasing a Schottky diode of a microscope probe, said probe having a beam portion and a pointed portion integral with said beam portion, said beam portion extending in a first dimension and said pointed portion extending in a second dimension normal to said first dimension, said pointed portion having a planar tip oriented in a plane normal to said second dimension, said Schottky diode being disposed at said tip of said pointed portion and having a junction area of not more than 1,000,000 square angstroms; and determining a temperature of said Schottky diode based on a magnitude of a current flowing through said Schottky diode.

* * * * *

UNITED STATES PATENT AND TRADEMARK OFFICE
CERTIFICATE OF CORRECTION

PATENT NO. : 5,713,667
DATED : February 3, 1998
INVENTOR(S) : Alvis, Roger; Erickson, Andrew N.; Raheem Kizchery, Ayesha; Romero, Jeremias D.; Tracy, Bryan M.

It is certified that error appears in the above-identified patent and that said Letters Patent is hereby corrected as shown below:

Col. 2, equation 1, line 67, delete "$(e^{gvkt}-1)$" and insert --$(e^{qv/kt}-1)$--.

Signed and Sealed this

Nineteenth Day of January, 1999

Attest:

Attesting Officer

*Acting Commissioner of Patents and Trademarks*